United States Patent [19]
Malmstrom

[11] Patent Number: 5,901,359
[45] Date of Patent: May 4, 1999

[54] SYSTEM AND METHOD FOR A WIRELINE-WIRELESS NETWORK INTERFACE

[75] Inventor: Douglas Allen Malmstrom, Longmont, Colo.

[73] Assignee: U S West, Inc., Denver, Colo.

[21] Appl. No.: 08/778,491

[22] Filed: Jan. 3, 1997

[51] Int. Cl.⁶ .................................................. H04Q 7/22
[52] U.S. Cl. .................... 455/461; 455/422; 455/435; 379/207
[58] Field of Search .................................... 455/403, 422, 455/414, 417, 435, 433, 445, 461, 567; 379/207, 210

[56] References Cited

U.S. PATENT DOCUMENTS

| | | | |
|---|---|---|---|
| 5,353,331 | 10/1994 | Emery et al. | 455/461 |
| 5,457,736 | 10/1995 | Cain et al. | 455/439 |
| 5,469,496 | 11/1995 | Emery et al. | 455/461 |
| 5,475,735 | 12/1995 | Williams et al. | 455/435 X |
| 5,506,887 | 4/1996 | Emery et al. | 455/461 |
| 5,548,636 | 8/1996 | Bannister et al. | 455/414 X |
| 5,592,533 | 1/1997 | McHenry et al. | 455/461 X |
| 5,734,981 | 3/1998 | Kennedy, III et al. | 455/445 |
| 5,742,905 | 4/1998 | Pepe et al. | 455/461 |
| 5,796,729 | 8/1998 | Greaney et al. | 370/345 |

FOREIGN PATENT DOCUMENTS

92/17986 10/1992 WIPO .

OTHER PUBLICATIONS

Undated Pacific Bell Prime Access Brochure (4 pages).
"Cellular Mobile Radio as an Intelligent Network Aplication" M. Ballard, E. Issenmann, M. Moya Sanchez, Electrical Communication vol. 63 #4, 1989.

"Intelligent Network Concepts in Mobile Communications" Bijan Jabbari IEEE Communications Magazine, Feb. 1992.

"System 900: The ISDN Approach to Cellular Mobile Radio" M. Wizgall, W. Weiss Electrical Communication vol. 63 #4, 1989.

Primary Examiner—Curtis A. Kuntz
Assistant Examiner—William G. Tsost
Attorney, Agent, or Firm—Brooks & Kushman

[57] ABSTRACT

A single-number service for providing integrated wireless and wireline communication networks for forwarding a call incoming to a subscriber's designated single telephone number to a routing destination number based on the subscriber's current location is provided. The single-number service includes storing subscriber mobile registration status in a wireline location register (WLR) of the wireline communication network. The subscriber mobile registration status is retrieved upon receiving the call incoming to the subscriber's designated single telephone number. The call is routed to a wireline destination stored in the WLR in response to the subscriber mobile registration status indicating that the subscriber is wireline registered. A subscriber location request is sent from the WLR to the Home Location Register (HLR) of the wireless network in response to the subscriber mobile registration status indicating that the subscriber is wireless registered. A routing request is sent from the HLR to the MSC where the subscriber is registered in response to receiving the subscriber current location request. A wireless routing destination number (TLDN) is communicated from the MSC to the WLR. The call incoming to the subscriber's directory number is routed by the WLR to the wireless routing destination number (TLDN).

12 Claims, 10 Drawing Sheets

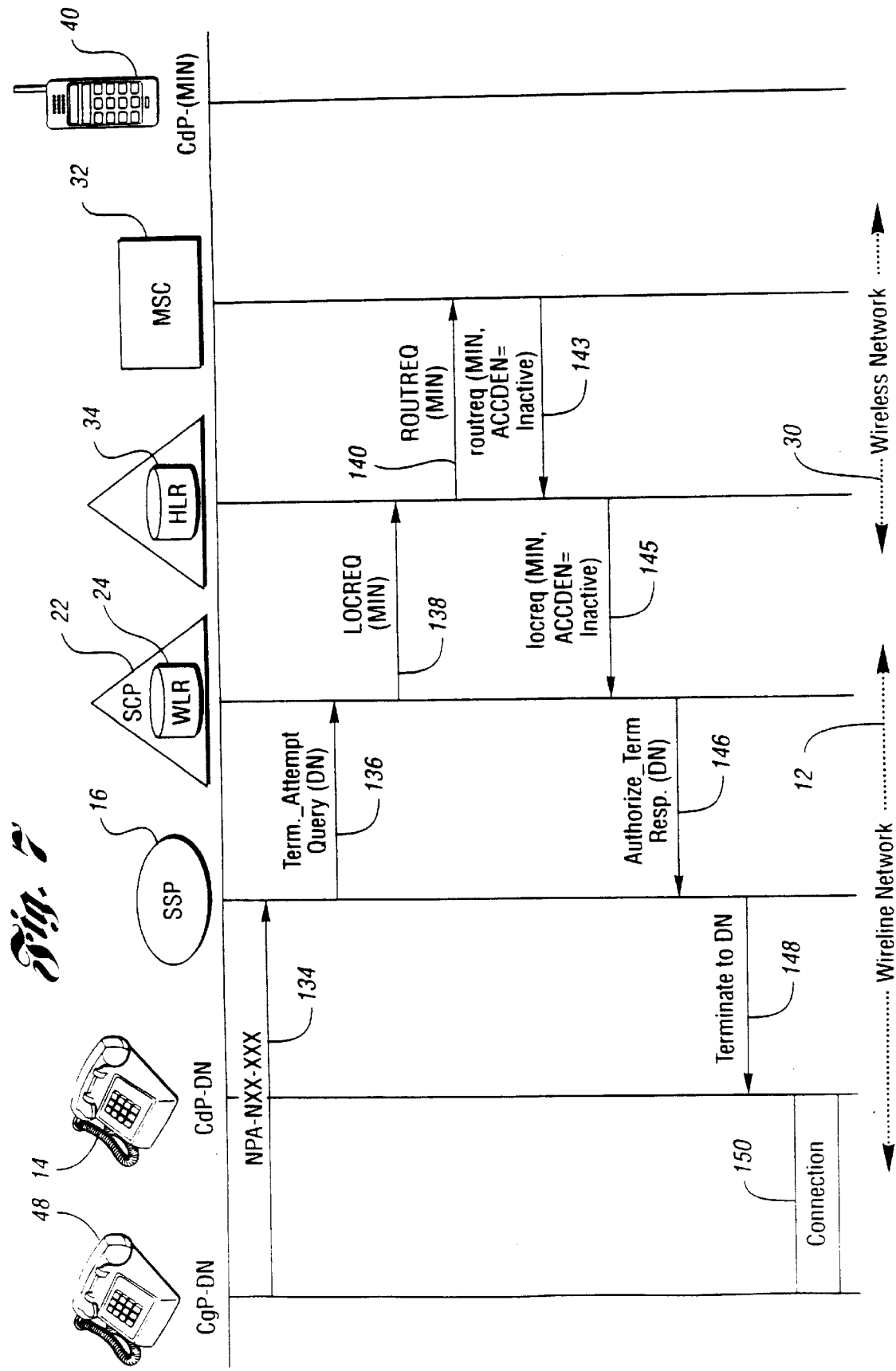

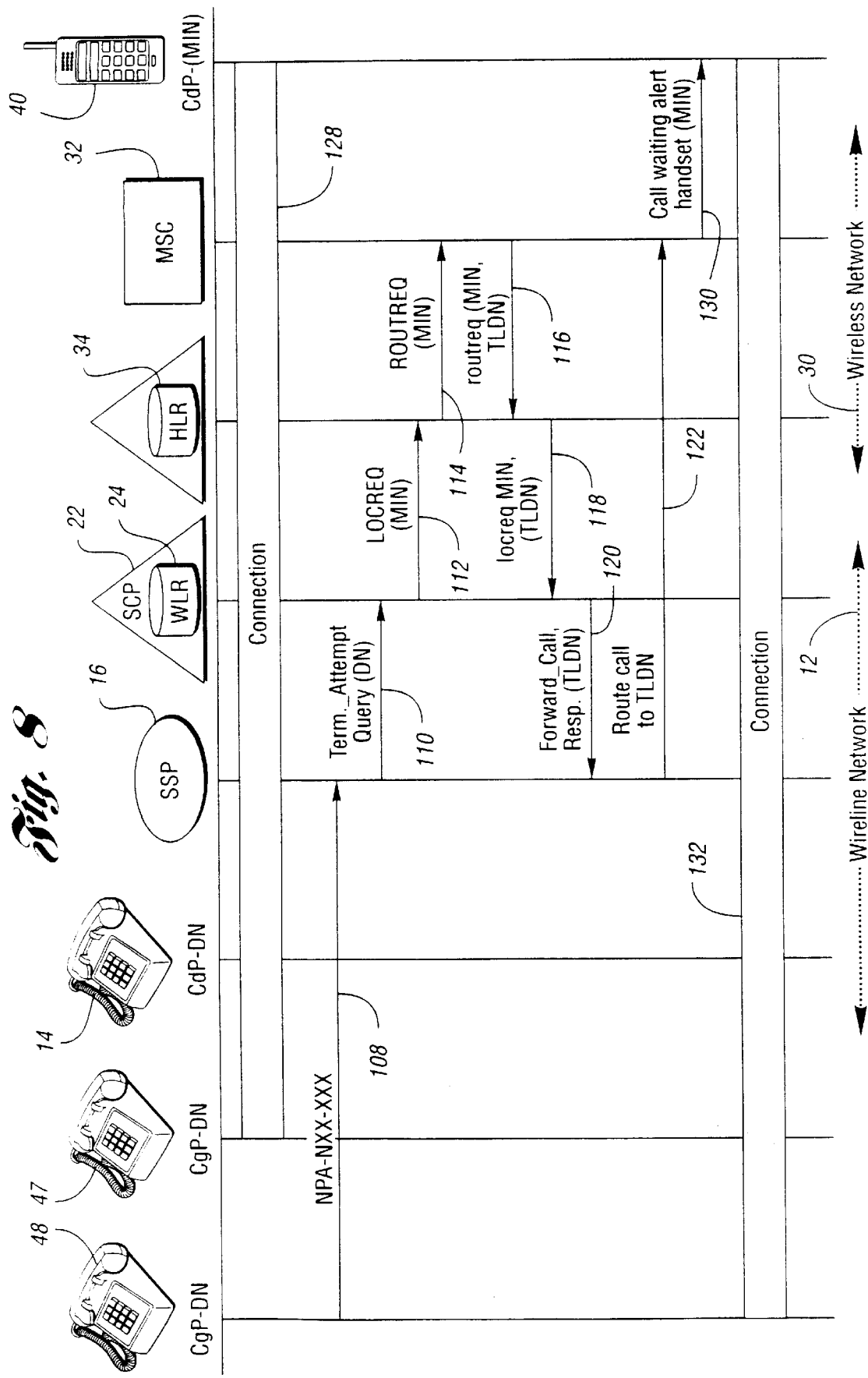

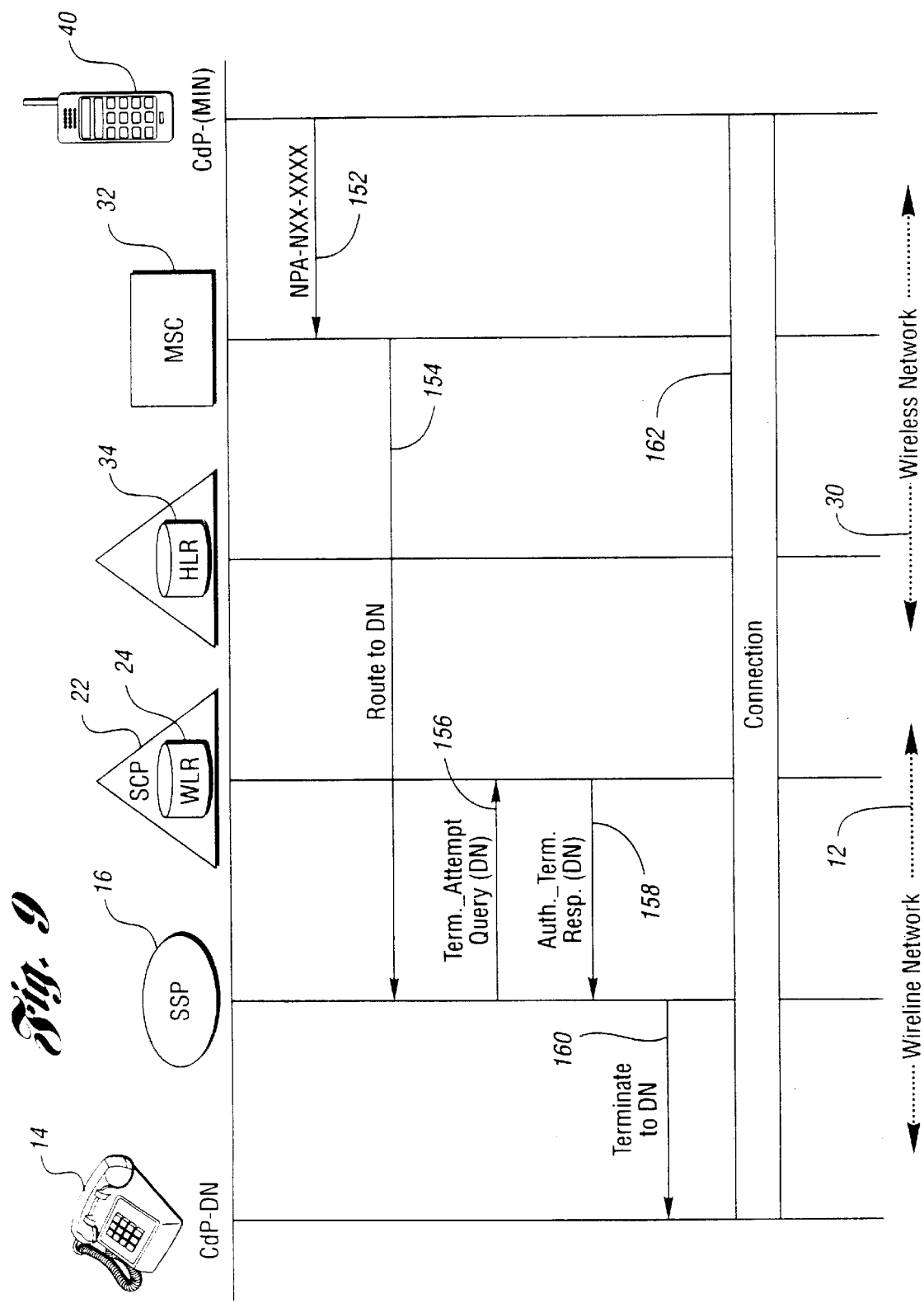

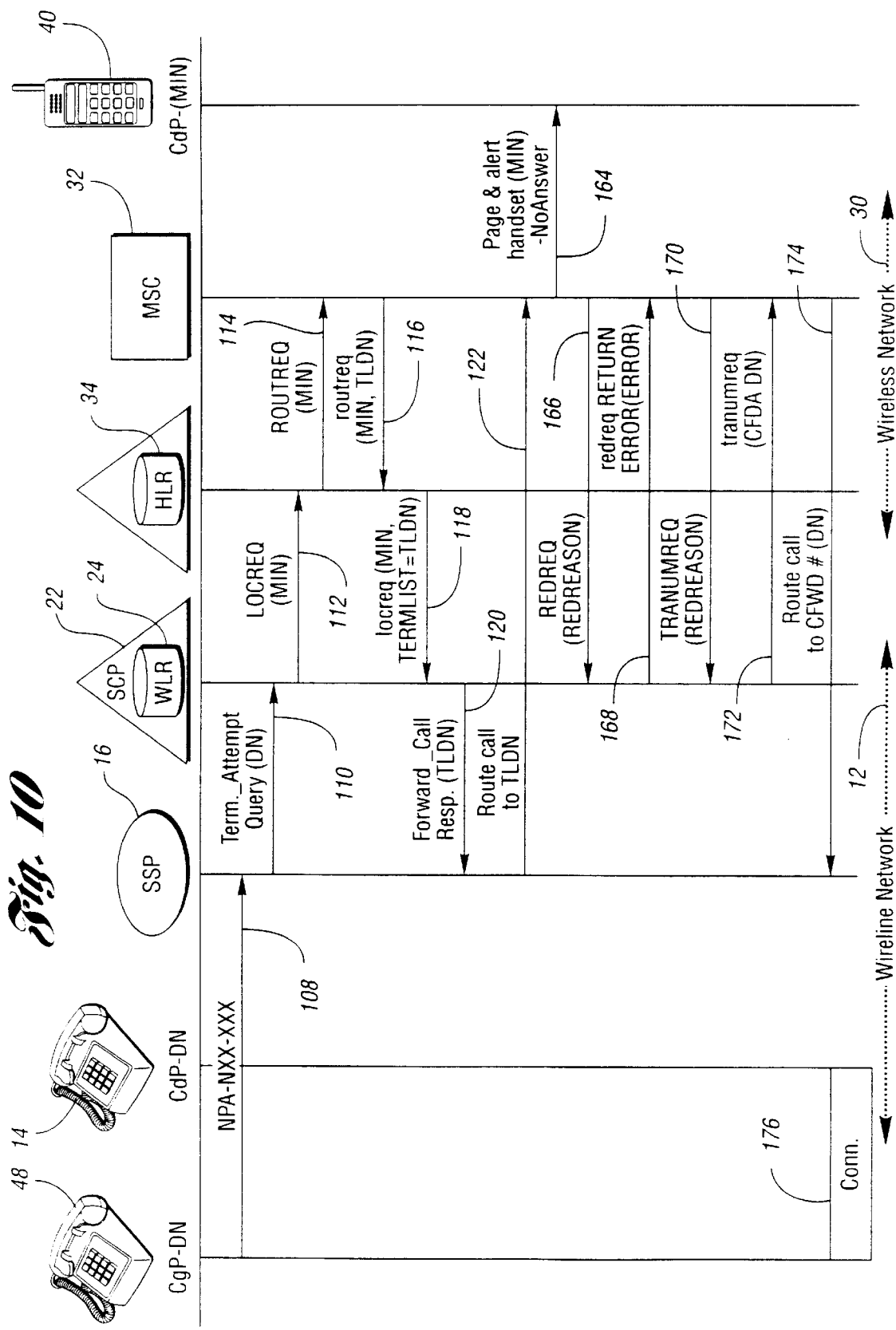

SYSTEM AND METHOD FOR A WIRELINE-WIRELESS NETWORK INTERFACE

TECHNICAL FIELD

This invention relates to a system and method for providing an interface between a wireline and wireless network.

BACKGROUND ART

Today, wireless and wireline services operate completely independent of each other, each supported, respectively, by a wireless and wireline network. Each network provides the subscriber with a separate telephone number and separate services, as well as separate subscriber interfaces. Such service bifurcation has resulted in duplicate transport, switching, operations and billing for each network. Current communication between the wireless and wireline networks is limited to internetwork call delivery. Internetwork call delivery occurs when a wireless (or "mobile") subscriber calls a wireline directory number (DN) or when a wireline subscriber calls a wireless mobile identification number (MIN).

Personal Communication System (PCS) development creates an opportunity for traditional carriers to enhance wireline services by augmenting them with wireless capabilities. These capabilities provide services which enable subscribers to simultaneously enjoy the benefits of wireless and wireline technology integrated within a common service context. These services, however, are not presently capable of providing a single-number service which allows a subscriber to receive and make calls on either a wireless or wireline telephone using a common telephone number.

However, since wireline and wireless networks have evolved from different architectural foundations using different databases and protocols for call processing, no internetwork interfaces exist between wireless and wireline networks to support development of hybrid wireless/wireline services. This in turn makes the creation of an integrated network, with services such as the single-number service, complicated due to the lack of internetworking interfaces between the wireless and wireline domains. Wireline networks use Line Information Databases (LIDB) and Advanced Intelligent Network (AIN) protocols for call processing, whereas wireless networks use Home Location Register/Visitor Location Register (HLR/VLR) databases and IS-41 architecture protocols.

Another impediment is that both types of networks manage calls independently without provisions for handing-off calls from one domain to the other depending upon subscriber location. For example, the wireline architecture assumes that a subscriber is always reachable via a directory number (DN) and the wireless architecture assumes that a subscriber is always reachable via a mobile identification number (MIN).

Furthermore, development of single-number wireless/wireline call service requires timely network status information exchange between the wireless and wireline networks, in order to perform efficient single-number wireless/wireline call routing. Wireless communications are of great value to subscribers who roam large geographic areas. However, some of these wireless subscribers may desire to be accessed via a wireline telephone number. Currently, no such wireless/wireline internetworking interface exists which is capable of supporting efficient network status information exchange and routing between the wireless and wireline networks.

Internetworking functions must also support the processes of updating location status information concerning subscriber movement between wireline and wireless networks and then routing single-number calls to the appropriate network based upon current subscriber location. Robust single-number service requires interaction between the wireless and wireline networks so that when the mobile handset associated with the MIN is activated, the wireless network informs the wireline network. Thus, to satisfy a subscriber who is roaming in the cellular network and would like calls incoming to his directory number delivered directly to him, requires coordination between the two networks. No current mechanism exists to allow internetworking.

U.S. Pat. No. 5,353,331 issued to Emery et al discloses a personal communications service using wireline/wireless integration. However, in this system, a traditional wireless feature —the Home Location Register—is located in a traditional wireline feature, the Integrated Service Control Point (ISCP). This approach means that the two networks are combined and controlled from the wireline ISCP. In effect, the ISCP acts like a mobile service controller for the subscriber when the subscriber is roaming. Thus, under this disclosure, the two networks are actually a single entity.

Consequently, a need has developed to provide a method and system for providing an improved method of interface to act between the separate wireless and wireline networks which permits the coordination and cooperation needed for a single-number service. This interface method incorporates enhanced IS-41 architecture and protocol extensions to provide support for a new architectural entity, a Wireline Location Register (WLR), which is a database located in the Service Control Point (SCP) of the wireline network. The WLR is able to communicate with the HLR for exchange of wireless/wireline network status information. Development of these extensions will allow users to simultaneously enjoy the benefits of wireless and wireline technologies integrated within a single-number service concept.

SUMMARY OF THE INVENTION

It is an object of the present invention to provide a method and system to provide an interface between the wireline and wireless communication networks.

It is another object of the present invention to provide a method and system to provide a single-number service between the wireline and wireless communication networks.

It is a further object of the present invention to provide a method and system as described above which gives a subscriber the perception of a single hybrid wireless/wireline service, even though the service may actually be delivered by two separate networks but integrated to support the appearance of the single-number service concept.

It is still a further object of the present invention for a single-number service through which a subscriber can be reached by a calling party dialing a single-telephone number assigned to the subscriber, regardless of the subscriber's location in the wireline or wireless networks.

It is yet still a further object of the present invention to provide a single-number call routing service adapted for use with an internetwork interface having mapping and address routing capabilities for routing a wireline DN call to a wireless number (MIN), whenever the single-number subscriber is registered within the wireless domain.

It is yet another object of the present invention to provide a method and system as disclosed above which are further adapted for use in cooperation with existing wireline switches in an Advanced Intelligent Network (AIN) so as to minimize the need for additional network components.

In carrying out these and other objects and goals of the present invention, a system is disclosed for providing an interface between the wireless and wireline communication networks. This interface provides for supporting single-number services and forwarding a call incoming to a subscriber's designated single telephone number to a routing destination number based on the subscriber's current location. A system is provided for an interface between wireless and wireline networks for supporting single-number services and the exchange of network status information in order to route a call incoming to a subscriber's single telephone number to either a subscriber's mobile unit through a Mobile Services Controller (MSC) or to a subscriber's customer premises equipment (CPE) through a Service Switching Point (SSP) depending on the location of the subscriber.

The system includes a Wireline Location Register (WLR) located in the wireline communication network and in electrical communication with the SSP for storing subscriber routing information and subscriber registration status data. Further provided is a Home Location Register (HLR) located in the wireless communication network and in electrical communication with the WLR and the MSC for storing and communicating to the WLR subscriber routing information and subscriber registration status data. Also included is a service control point (SCP) located in the wireline communication network and provided in electrical communication with the WLR and the SSP. The SCP is operable to retrieve the subscriber routing information and provide the subscriber routing information to the SSP. In another embodiment, included is a Visitor Location Register (VLR) located in the wireless communication network and provided in electrical communication with the HLR and the MSC. The VLR enables the WLR to issue a query to the HLR requesting routing destination for subscribers who are wireless registered, which allows the delivery of the call to the appropriate wireless or wireline telephone number destination.

In further carrying out the above objects, features and advantages of the present invention, there is provided a method for providing an interface between the wireless and wireline networks in order to support a single-number service to forward a call incoming to a subscriber's designated single telephone number to a routing destination number based on the subscriber's current location. A subscriber mobile registration status is stored in a wireline location register (WLR) located in the wireline communication network. The WLR is in electrical communication with a wireline switch and a Home Location Register (HLR). A wireline switch is monitored to detect predetermined AIN triggers. A registration query is generated at the wireline switch for receipt by the WLR upon detection of the predetermined AIN triggers, so as to request subscriber mobile registration status data. The subscriber mobile registration status is retrieved upon receiving the call incoming to the subscriber's designated single telephone number.

In keeping with the invention, wireline DN calls are routed to wireline destinations in response to the subscriber's WLR mobile registration status data indicating that he/she is wireline registered. A first mobile query at the WLR to the Home Location Register (HLR) of the wireless network in response to the subscriber mobile registration status indicating that the subscriber is wireless registered, so as to request a current subscriber mobile location. A second mobile query is generated at the HLR to the Mobile Switching Center (MSC) where the subscriber is registered, so as to request a wireless routing destination number. A wireless routing destination number is communicated from the MSC to the WLR through the HLR. The call is routed from the wireline switch to the MSC to the wireless routing destination number.

The single-number internetworking function can be subdivided in to the following areas: Location Determination; DN/MIN Mapping; Call Routing; and Services Synchronization. Implementation of single-number service requires development of wireless/wireline internetworking functions, such as address mapping logic, which map DN's to MINS's whenever subscribers are with in the wireless domain. Furthermore, wireless/wireline internetworking logic must support timely location status information exchange concerning subscriber movement between network domains.

The above objects and other objects, features and advantages of the present invention are readily apparent from the following detailed description of the best modes for carrying out the invention when taken in connection with the accompanying drawings wherein like reference numerals-correspond to like components.

BRIEF DESCRIPTION OF THE DRAWINGS

FIG. 7 is a call flow diagram illustrating wireless subscriber call delivery inactive in a manner according to the present invention;

FIG. 8 is a call flow diagram illustrating call waiting to a wireless subscriber in a manner according to the present invention;

FIG. 9 is a call flow diagram illustrating wireless subscriber calling home in a manner according to the present invention; and FIG. 10 is a call flow diagram illustrating an unanswered call to a registered wireless subscriber in a manner according to the present invention.

BEST MODES FOR CARRYING OUT THE INVENTION

Figure 1:
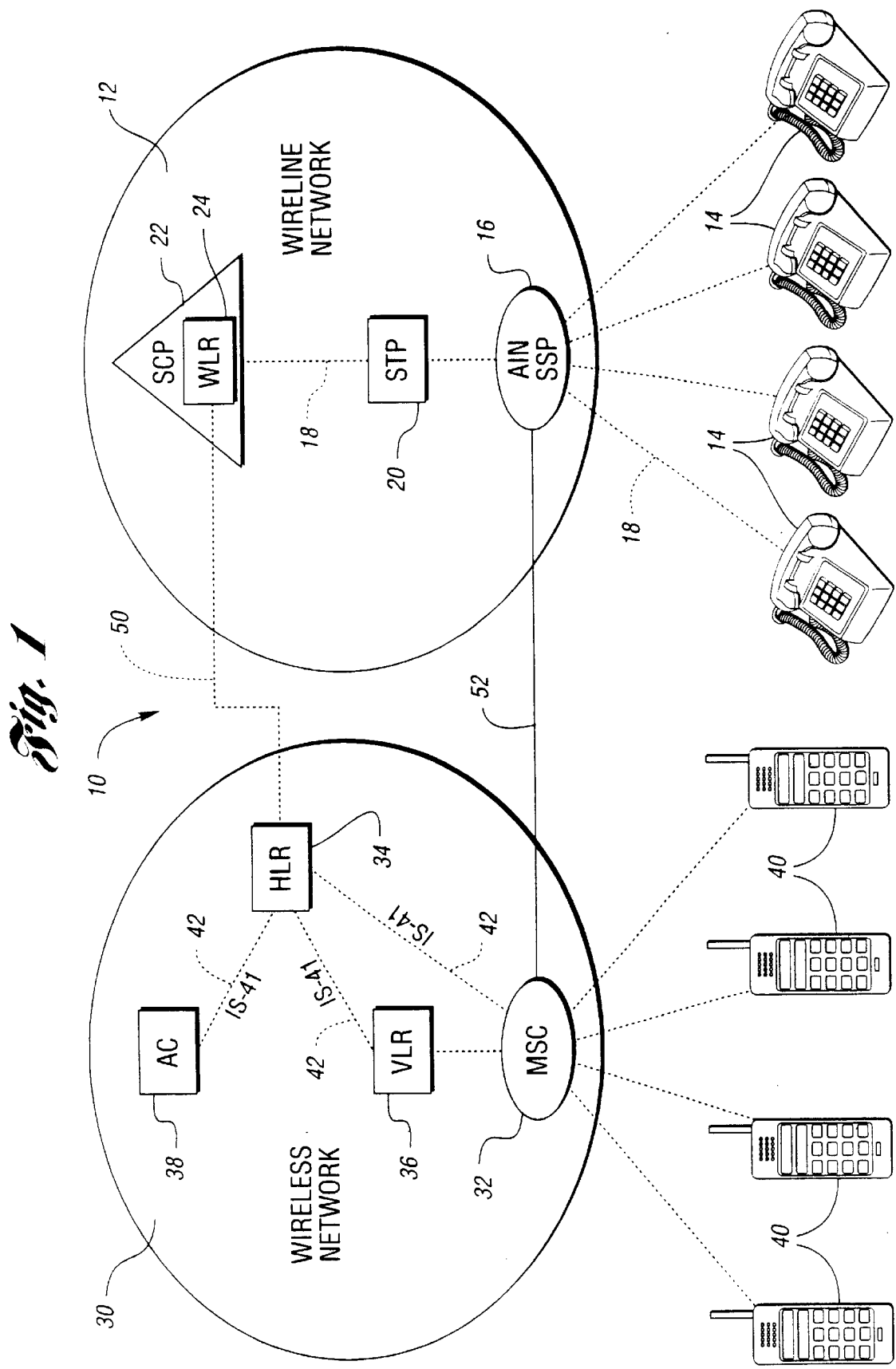
FIG. 1 is a schematic diagram of a system according to the present invention for providing an integrated wireline/wireless network to subscriber's of a single-number service.

With reference to FIG. 1 of the drawings, there is provided a schematic illustration of an integrated wireline/wireless network system according to the present invention which is designated generally by reference number 10.

With further reference to FIG. 1, a representative diagram of Advanced Intelligent Network (AIN) architecture is provided for use in a wireline Public Switched Telephone Network (PSTN), and as part of integrated network system 10. The AIN architecture referred to is generally designated by reference numeral 12. Architecture 12 is known to those skilled in the art to permit subscriber services to be extended throughout the wireline network. Specifically, architecture 12 is utilized for updating the subscriber service profile which contains subscriber specific data regarding how calls should be handled.

Further, as those skilled in the art will recognize, architecture 12 is implemented with a Common Channel Signaling (CCS) protocol 18, such as Common Channel Signaling System No. 7 (hereinafter referred to as "SS7 protocol"). The SS7 protocol is an out-of-band signaling path comprised of various packet switching elements 20 and transmission signaling links 18, some of which are shown in architecture 12. As more fully set forth in FIG. 1, the Customer Premises Equipment (CPE) device of the caller and subscriber is represented and designated as telephone 14. However, it is clear that the CPE's may include a modem, a facsimile machine, a voice messaging peripheral, or any other telecommunication equipment that may receive or transmit voice or data. As those skilled in the art will recognize, in operation, each telephone 14 is provided in electrical communication with a Service Switching Point (SSP) 16.

SSP 16 is generally a node (usually the subscriber's local switch/central office switch) that is provided in electrical communication with CPE 14 through the PSTN. SSP 16 is an AIN capable switch. SSP 16 recognizes the predetermined AIN "triggers" used when a subscriber or user invokes a subscriber service. More particularly, in the present invention, SSP 16 recognizes the triggers associated with a calling party dialing a subscriber's telephone number designated as a single-number service DN. SSP 16 further communicates with SCP 22 (discussed herein) to operate the service. The electrical communication between CPE 14 and SSP 16 is made via signaling links 18. As shown generally in FIG. 1, SSP 16 is further provided in electrical communication with SCP 22 via Signal Transfer Points (STP's) 20 and signalling links 18. STP's are packet switches used to route signaling messages within wireline network 12 as well as route call routing instructions to SSP 16. In still other embodiments, features such as an Intelligent Peripheral (not shown) which are well known in the art may also be incorporated. A Service Control Point (SCP) 22 is incorporated as shown in FIG. 1 and as further discussed below.

SCP 22 is a node which contains the service logic and associated data support needed to execute required customer and subscriber services, such as the single-number service of the present invention. The service logic contained in SCP 22 includes a service profile for each subscriber or subscription service. SCP 22 may also be classified as an Integrated Service Control Point (ISCP) which is an integrated system well known in the art. Service logic stored in SCP 22 is accessible to each predetermined SSP 16 in the telephone system or network. SCP 22 is further provided in electrical communication with the Wireline Location Register (WLR) 24 database more fully disclosed herein. Preferably, WLR 24 is located in SCP 22.

Again referring to FIG. 1, the wireless network portion of system 10 is designated generally as reference number 30. Wireless network 30 consists of four basic components: a cell site containing a controller and radio transceiver; system interconnections; and mobile or portable units. Mobile Switching Center (MSC) 32 (or Mobile Telephone Switching Center (MTSC)) is known to those skilled in the art as a digital telephone exchange which controls the switching between the PSTN and mobile cell sites for all wireline-to-mobile, mobile-to-wireline, and mobile-to-mobile calls. In operation, when MSC 32 receives a call from the PSTN which is directed to a MIN, MSC 32 deciphers the telephone number dialed by the wireline user and alerts the controllers at all cell sites to page a corresponding mobile unit 40. Similarly, when mobile unit 40 places a call, the MSC accepts the dialing data from the cell site controller and dials the desired number for transmission to the PSTN. MSC 32 also processes mobile registration status data received from the cell site controller, switches calls to other cells, processes diagnostic information, and compiles mobile billing statistics.

Typical wireless networks 30 include multiple adjoining cells each of which contains at least one cell site controller which operates under the direction of the MSC 32. The cell site controller manages each of the radio channels at the site, supervises calls, turns the radio transmitter and receivers on and off, injects data onto the control and user channels, and performs diagnostic tests on the cell site equipment. Cells may contain multiple radio transmitters and radio receivers. As those skilled in the art will further recognize, in operation multiple receivers are generally tuned to the same frequency. However, the receiver which locates the stronger radio signal is continuously selected. Furthermore, cells typically have at least one radio channel that transmits control data to and receives control data from the mobile units. This control data advises the mobile unit that a call is coming from the MSC or conversely, advises the controller that a mobile telephone user desires to place a call. To complete the connection, the controller uses the control channel to advise the mobile unit which user channel had been assigned to the call.

MSC 32 is the functional equivalent to the SSP 16 of the wireline network. MSC 32 also retrieves all necessary data to respond to subscriber call requests from three databases—the Home Location Register (HLR) 34, the Visitor Location Register (VLR) 36, and the authentication center (AC) 38—each discussed more fully herein. In turn, MSC 32 provides databases 34, 36 and 38 with updated information on subscriber mobile registration status and location.

To register a subscriber in the wireless network 30, MSC 32 ascertains whether a subscriber is present in the wireless network 30 when the subscriber places a call via mobile unit 40, receives a call via mobile unit 40, or by automatic registration. Specifically, each time mobile unit 40 is powered on or a call is originated from mobile unit 40, certain information is transmitted to MSC 32, including the unit's MIN, Electronic Serial Number (ESN) and System Identification (SID).

The Home Location Register (HLR) 34 is a master database for storing data related to each mobile subscriber, such as the subscriber profile and mobility information together with their relevant permanent (static) data, such as access capabilities and subscriber services. In addition, HLR 34 is in electrical communication with and provides MSC 32 with information about the MSC 32 service area where the mobile unit 40 is actually located (temporary or dynamic data) to allow incoming calls to be routed immediately to the called subscriber's mobile unit 40.

The Visitor Location Register (VLR) 36 is a functional element which corresponds to one or several MSC's 32. VLR 36 is in electrical communication with MSC 32 and HLR 34. VLR 36 contains detailed data on location and service data regarding each subscriber entering its coverage area for routing which is used for incoming and outgoing calls. This allows MSC 32 to set up incoming and outgoing calls and is designed so information can be moved to MSC 32 to expedite call implementation. VLR 36 is a dynamic subscriber database, exchanging considerable amounts of data with its related HLR 34. Data stored in VLR 36 follows subscribers when they enter another VLR area.

Querying of HLR 34 is somewhat different. The gateway MSC has to query HLR 34 after receiving the call setup message from the PSTN wireline network. During the querying, the call is suspended as its destination is unknown. The authentication center (AC) 38 is needed to store key information and security database information. AC 38 is in electrical communication with HLR 34.

As is well-known in the art, the IS-41 architecture standard defines signalling, mobility control and handoff rules throughout the wireless domain 30.

INTEGRATED SYSTEM AND ARCHITECTURE

To achieve the desired wireless/wireline network interface and single-number service functionality contemplated according to the present invention, there is provided integrated wireless/wireline network 10 as shown in FIG. 1. As recognized by those skilled in the art, in order to support the operation of the wireless/wireline interface of the wireline WLR network element 24 and its communication with the wireless HLR 34, protocol extensions are provided which are based on IS-41 Rev. C architecture. It is through these protocol extensions (collectively designated as "IS-41+") that messaging and signalling functions are handled by WLR 24, and communicated to and from WLR 24. The IS-41+ integration architecture supports the application layer communications between the wireless 30 and wireline 12 networks to implement the single-number service according to the present invention.

Thus, in accordance with the present invention, WLR 24 and HLR 34 are interconnected via signaling trunks and circuits and use messaging techniques to handle the single-number service mobility functions. This signalling connection 50 between WLR 24 and HLR 34 minimizes (if not eliminates) upgrades to existing switches and leverages existing AIN SSP and SCP functionalities to integrate the disparate wireless and wireline networks in a unified manner to support 10-digit DN single-number wireless/wireline call routing based upon current subscriber location.

The IS-41+ architecture can use a variety of transport options and configurations. As shown in FIG. 1 and referenced above, the system 10 according to the present invention is adapted to be used with existing wireline switches such as SSP 16 as described above. As will be appreciated by those skilled in the art, IS-41+ disclosed herein in accordance with the present invention has the traditional functionality of IS-41 plus the added functionality of allowing WLR 24 to directly communicate with HLR. More particularly, the term "IS-41+" disclosed herein is used to signify the added functionality of supporting WLR 24 and its messaging features with HLR 34. The IS-41+ architecture is well-poised for a smooth transition to the evolving Personal Communications System and other integrated systems.

WLR 24 is a database preferably resident within Service Control Point (SCP) 22 of wireline network 12. WLR 24 represents a combination of IS-41 HLR/VLR functionality implemented within a single wireline network element. First, the HLR-functionality of WLR 24 supports message exchange procedures enabling wireline network 12 to determine when single-number service subscribers become registered or become deactivated within wireless network 30. Second, the VLR-functionality enables WLR 24 to issue location request messages to HLR 34 to determine routing location information for single-number subscribers registered in wireless domain 30.

WLR 24 eliminates unconditional querying of HLR 34 by wireline network 12 to determine registration status and routing information. IS-41+ also supports service synchronization between HLR 34 and WLR 24 providing the appearance of a singular seamless service between wireless 30 and wireline 12 networks. Single-number service subscribers thereby receive service in both the wireless 30 and the wireline 12 domain. Further, subscribers are permitted to keep their existing wireline DN's, which are automatically mapped to an associated, and preferably, unlisted wireless Mobile Identification Number (MIN) when the subscriber is wireless registered. Calls incoming to the subscriber's single-number DN will not ring at the subscriber's designated wireline base (i.e. home, work, etc.) while the associated mobile unit 40 is registered within the wireless domain 30.

Single-number functions supported by the wireless/wireline service logic program must support the following wireless/wireline internetworking functions: Location determination; DN/MIN Call Mapping; Call Routing; and Services Synchronization. The protocol enhancements provide a technical approach to implement wireless/wireline integration providing support for single-number service compatible with principles of IS-41 and AIN.

Generally, SSP 16 is connected to MSC 32 by trunk circuits 52, while wireless components such as MSC 32, HLR 34, VLR 36 and AC 38 are connected with each other by IS-41 Mobile Application Part (MAP) protocols 42 operating over SS7 or X.25 networks. IS-41 data trunks are packet switched networks, having either X.25 or SS7 type transport options. MSC 32 may also connect to STP's 20 by SS7 links.

OPERATION

Figure 2:
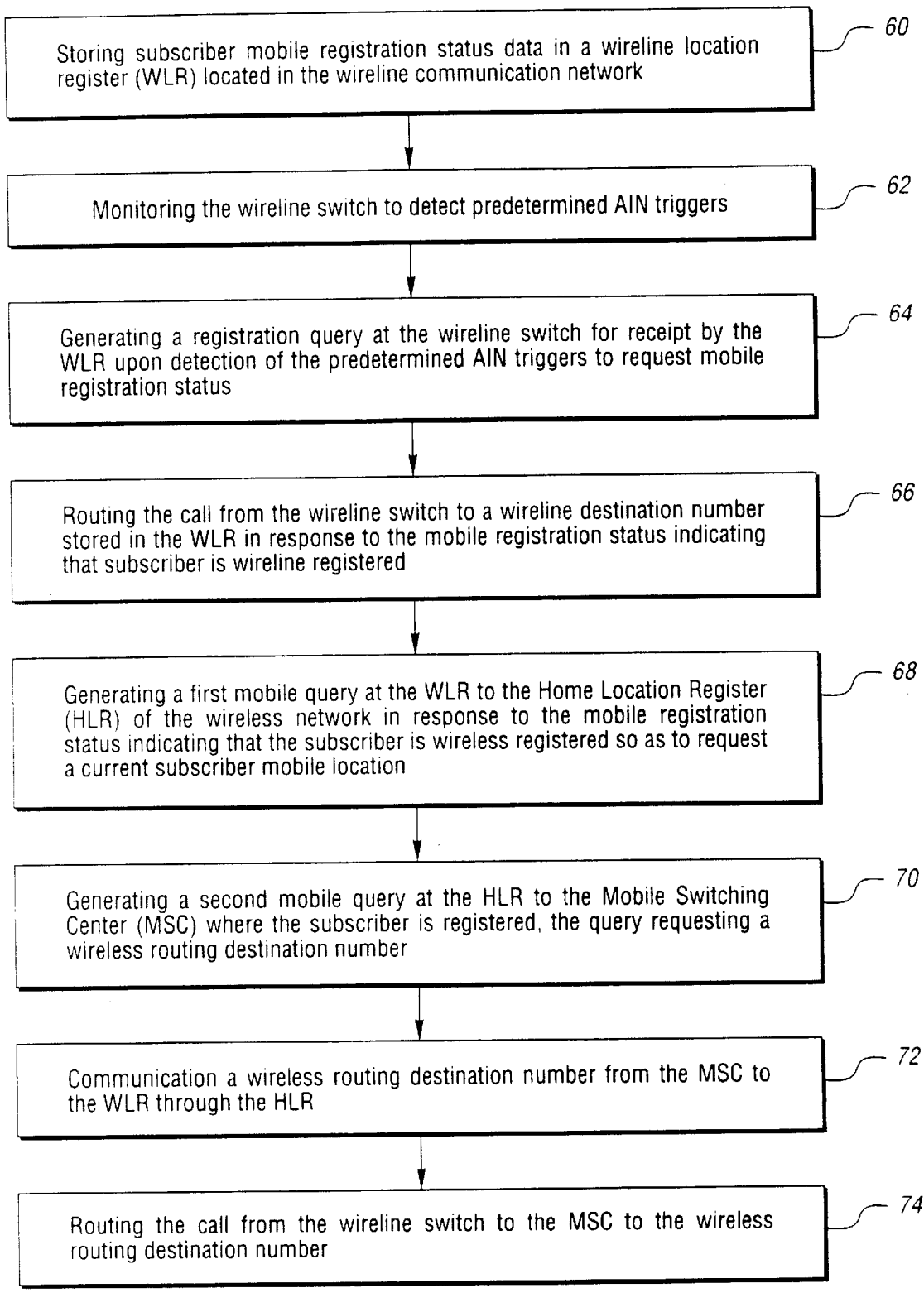
FIG. 2 is a block diagram of the method steps of the present invention.

With reference now to FIG. 2 of the drawings, the method of operation according to the present invention and, in particular, the interfacing functionality will be described in greater detail.

As shown in FIG. 2, a method according to the present invention includes the steps of storing a subscriber's mobile registration status in a wireline location register (WLR) 24 which is located in SCP 22 of the wireline communication network, as shown in block 60. WLR 24 is in electrical communication with a wireline switch (such as SSP 16) and a Home Location Register (HLR) 34. SSP 16 monitors to detect predetermined AIN triggers as shown in block 62. Further, as shown in block 64, a registration query is generated at SSP 16 for receipt by the WLR 24 upon detection of the predetermined AIN triggers, so as to request subscriber mobile registration status. The subscriber mobile registration status is retrieved upon SSP 16 receiving the call incoming to the subscriber's designated single telephone number.

In keeping with the invention, block 66 shows that the call from SSP 16 is routed to a wireline destination number stored in WLR 24 in response to the subscriber mobile registration status data indicating that the subscriber is wireline registered. Referring to block 68, a first mobile query at WLR 24 to the Home Location Register (HLR) 34 of wireless network 30 in response to the subscriber mobile registration status indicating that the subscriber is wireless registered, so as to request a current subscriber mobile location. As shown in block 70, a second mobile query is generated at the HLR 34 to the Mobile Switching Center (MSC) 32 where the subscriber is registered, so as to request a wireless routing destination number. A wireless routing destination number is communicated from MSC 32 to WLR 24 through HLR 34 as shown in block 72. The call is routed from SSP 16 to MSC 32 to the wireless routing destination number as shown in block 74.

Further provided herein are descriptions of call flows operable to perform various functions contemplated for the system and methods disclosed above in accordance with the present invention. In particular, the location determination, mapping, call routing and synchronization functionalities necessary to support the network interface will be described in further detail. As reference is made to FIGS. 3–10, it is noted that queries and affirmative messages are generally designated by all uppercase letters, while query and message responses are generally shown in smaller case letters.

LOCATION DETERMINATION

The location determination functionality according to the present invention represents the interworking functions between wireline 12 and wireless 30 networks responsible for exchange of mobile subscriber registration and location information. For example, if mobile unit 40 registers for cellular operation as previously stated, wireline network 12 must be capable of determining, through location status information exchange, that the subscriber is presently reachable through wireless network 30. In such cases, all single-number wireline DN call terminations must be mapped to an appropriate wireless MIN/mobile unit. Likewise when mobile unit 40 is deactivated or deregistered, wireline network 12 must be capable of determining, through location status information exchange, that all single-number calls should be directed or re-mapped to the DN (DN termination).

Note that the IS-41 protocols and messages (e.g. IS-41 Rev. C, REGNOT and MSINACT, etc.) can be used as a basis to implement location status information exchange between HLR 34 and WLR 24. To implement the single-number service, location status information must be maintained by and synchronized between both the wireless 30 and wireline 12 networks. Without IS-41 protocol extension development, wireline network 12 does not have an efficient way to determine whether or not a single-number mobile unit is registered within wireless domain 30.

Figure 3:
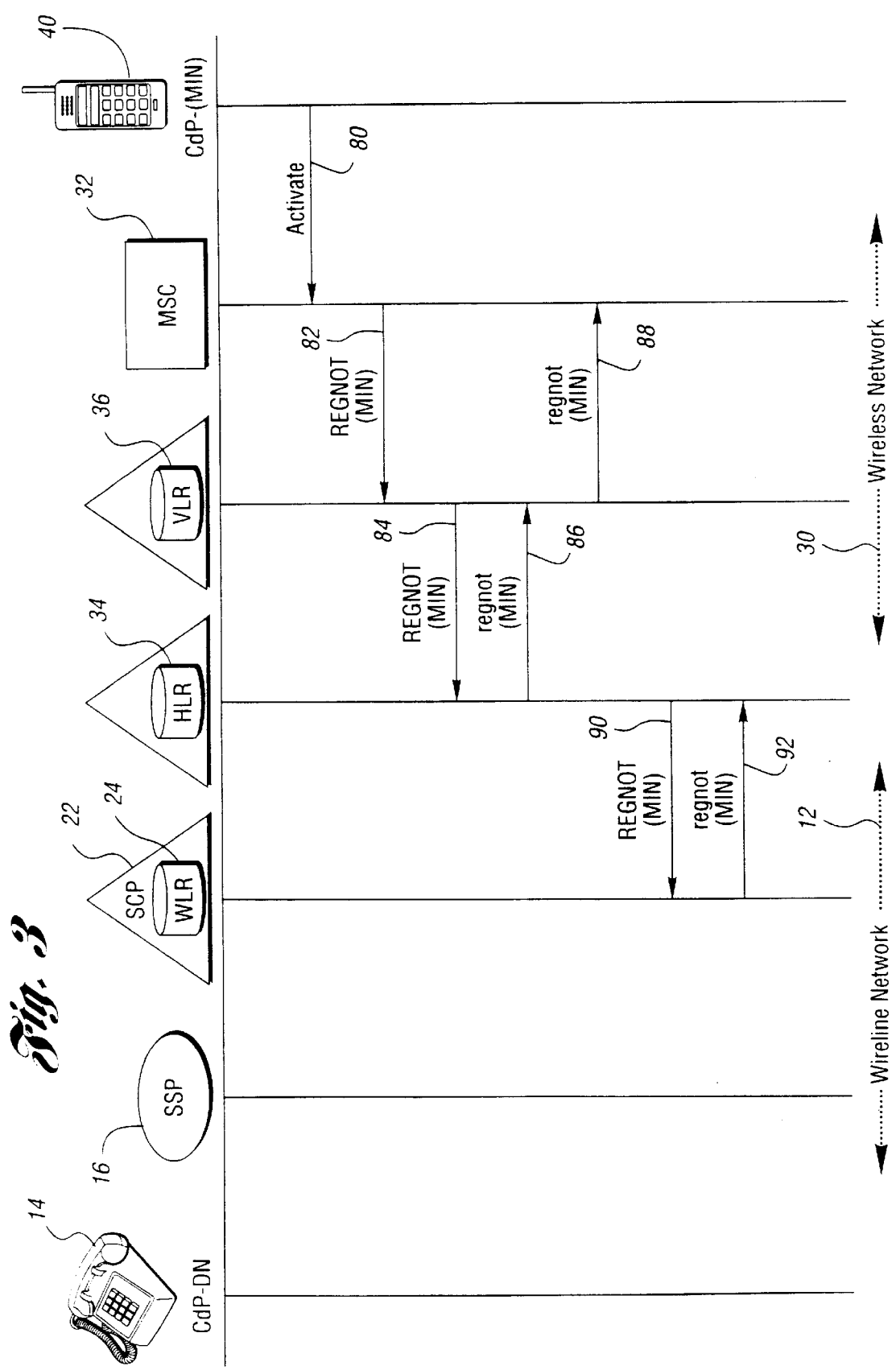
FIG. 3 is a call flow diagram illustrating wireless subscriber registration in a manner according to the present invention.

FIG. 3 illustrates the call flows involved in registering mobile unit 40 in wireless network 30. As illustrated in FIG. 3, a subscriber turns on his or her mobile unit 40 (not defined by IS-41) within proximity of MSC 32 (shown as 80). MSC 32 sends a Registration Notification ("REGNOT") message to its corresponding VLR 36 (shown as 82), which in turns forwards it to HLR 34 (shown as 84), indicating that the subscriber has become wireless registered in wireless network 30.

In further keeping with the invention, upon receiving the "REGNOT" message, HLR 34 forwards a Registration Notification Response ("regnot response") (shown as 86) back to VLR 36 which in turn forwards it to MSC 32 (shown as 88). Upon successfully registering, HLR 34 relays the REGNOT message to the WLR 24 indicating that the subscriber has transitioned from wireline network 12 to the subscriber's mobile unit 40/MIN of wireless network 30 (shown as 90). Upon receiving the message, WLR 24 sets the single-number subscriber as wireless registered, and returns a "regnot response" message to the HLR (shown as 92). REGNOT stimulates WLR 24 to route all subsequent DN terminated calls to the wireless domain 30, as long as the subscriber remains wireless registered.

Figure 4:
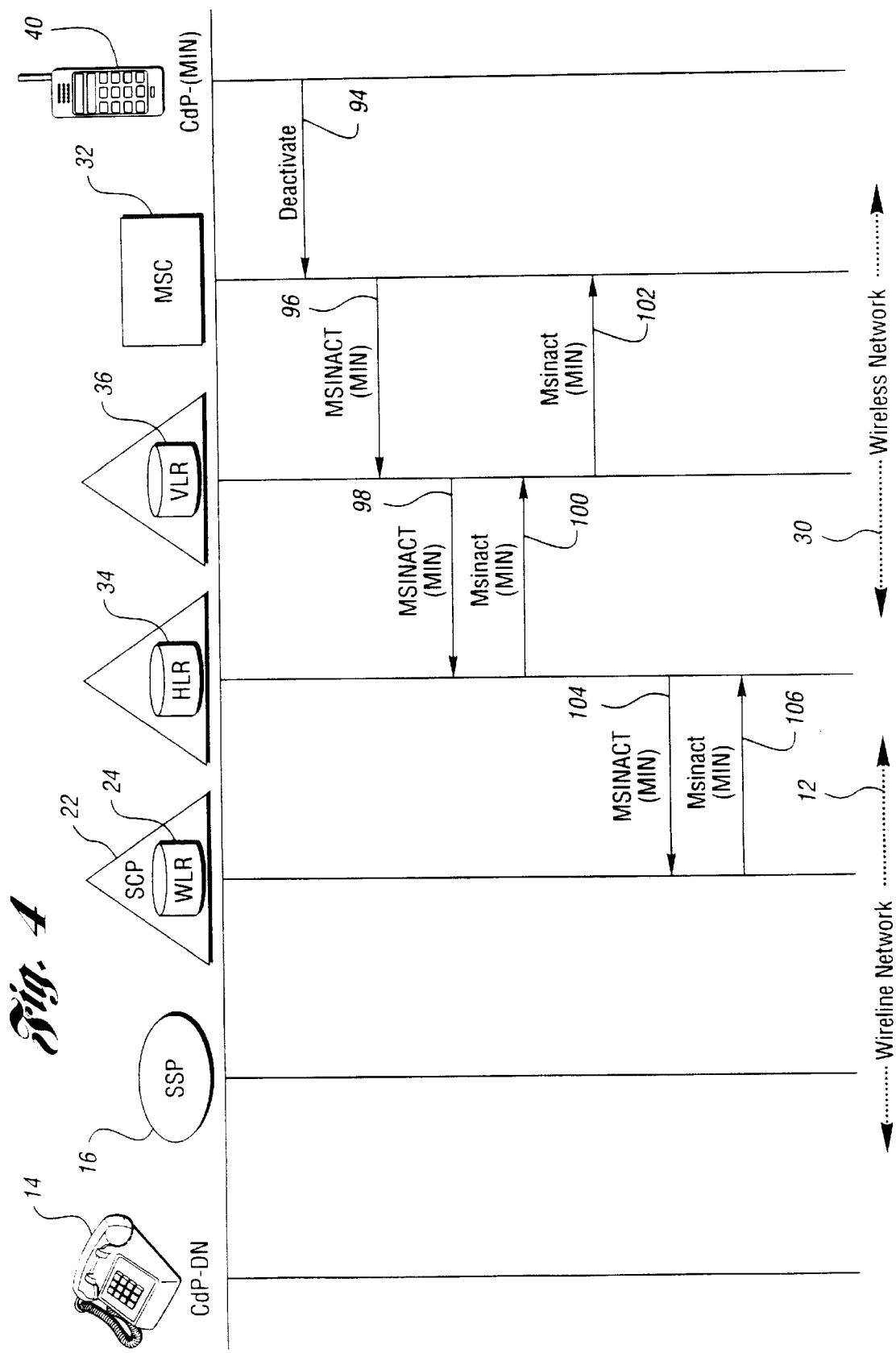
FIG. 4 is a call flow diagram illustrating wireless subscriber deactivation in a manner according to the present invention.

FIG. 4 illustrates the call flows involved in deactivating a wireless subscriber from wireless network 30. Referring now to FIG. 4, when the wireless registered subscriber deactivates mobile unit 40, the deactivation is detected by MSC 32 (shown as 94). MSC 32 then transmits a Mobile Service Inactive ("MSINACT") message to VLR 36 indicating the deactivation (shown as 96) which in turn forwards this message to HLR 34 (shown as 98). Upon receiving the message, HLR 34 returns a Mobile Service Inactive Response ("msinact response") to VLR 36 (shown as 100) which in turn returns it to MSC 32 (shown as 102). Meanwhile, HLR 34 sends MSINACT to WLR 24 across IS-41+ interface 50 (shown as 104), indicating that the subscriber is no longer active in wireless network 30 and that wireline network 12 must now deliver all single-number subscriber calls to subscriber's CPE 14 in wireline domain 12. Lastly, a "msinact response" is returned to HLR 34 from WLR 24 (shown as 106).

CALL MAPPING AND ROUTING

Mapping provides the single-number service subscriber with the capability to map a wireline DN call to a wireless mobile unit 40/MIN for purposes of call delivery to the subscriber who is currently located within wireless network 30. Again, note that the MIN may be treated as an unpublished number in the single-number service because a calling party will only dial the DN associated with the subscriber and not the MIN. Furthermore note that the reverse mapping (MIN to DN) is required in order to relate wireless usage to a common wireline DN telephone bill.

Wireless/Wireline call routing represents an internetworking function responsible for delivering single-number DN calls to the appropriate wireless 30 or wireline 12 network based upon current subscriber location information. The wireless/wireline call routing decision is made based upon location status information maintained within WLR 24, previously described. Note that since MIN's are expected to be an unpublished number, the wireless network 30 is not expected to perform call termination based upon MIN's. In fact, the wireless network can be prohibited from performing MIN call terminations to ensure that wireline network 12 maintains call termination control. The wireless/wireline call routing function is performed by AIN/SCP service logic using registration status information stored within WLR 24.

If a subscriber is wireless registered as previously discussed, the subscriber is located (or subscriber's mobile unit 40 is active) in wireless network 30 and all DN call terminations must be mapped to a corresponding MIN and delivered through the wireless network 30. If a subscriber is within wireline network 12, all DN call terminations must be delivered through wireline network 12. According to the present invention, mapping responsibility is distributed between both wireline 12 and wireless 30 networks. Note that this network distribution approach is probably the most efficient architecture to implement wireless/wireline DN/MIN address mapping. This results from the fact that translations can be made by direct look-up without searching.

Figure 5:
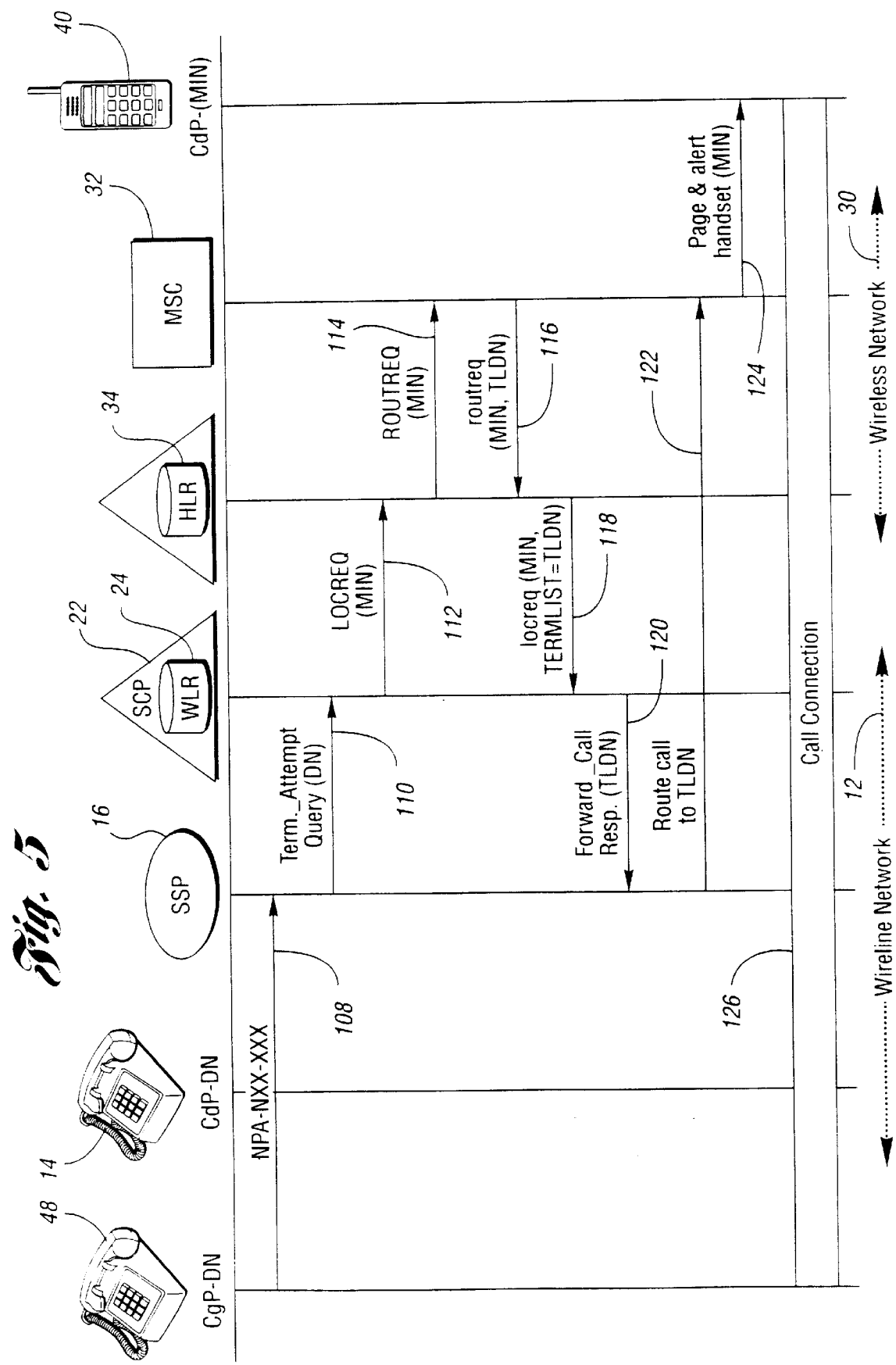
FIG. 5 is a call flow diagram illustrating a call complete to a wireless subscriber in a manner according to the present invention.

FIG. 5 illustrates the call flow when a call incoming to a single-number service subscriber's DN is complete to a subscriber's mobile unit 40 registered in the wireless network. Referring to FIG. 5, a calling party (CgP) calling from telephone 48 dials a 10-digit DN (NPA-NXX-XXXX) belonging to the single-number service subscriber, which is received by local switch SSP 16 for handling (shown as 108). In an effort to minimize, if not eliminate, modification to the base of embedded switches, SSP 16 interrupts the digits and is adapted to monitor for detection of predetermined AIN triggers, like the Termination Attempt Trigger ("TAT"); whereupon SSP 16 issues a Termination Attempt Query to SCP 22, which is in electrical communication with WLR 24 (shown as 110). WLR 24 receives this query, determines that the subscriber is wireless registered (as discussed in association with FIG. 3, above), and issues a Location a Request Query ("LOCREQ") to HLR 34 to determine the location (a wireless routing number or address) for the subscriber (shown as 112).

In keeping with the present invention, upon receipt of LOCREQ, HLR 34 issues a Routing Request Query ("ROUTREQ") to MSC 32 where the subscriber is registered (shown as 114). MSC 32 receives ROUTREQ from HLR 34 and returns a Routing Request Response ("routreq response") message containing a Temporary Location Destination Number (TLDN) for routing the call to the wireless registered subscriber (shown as 116). HLR 34 receives "routreq response" and returns a Location Request Response ("locreq response") to WLR 24 containing the TLDN (shown as 118). SCP 22 returns an AIN Forward Call response to SSP 16 containing TLDN as the routing number (shown as 120). SSP 16 routes the incoming call to the TLDN at MSC 32 (shown as 122). MSC 32 initiates paging and alerts the wireless registered single-number subscriber (or called party CdP) at mobile unit 40 of the routed call (shown as 124). The subscriber answers the incoming call at mobile unit 40 and the call connection is established with the calling party from telephone 48 (shown as 126). It is contemplated for the call flows which terminate at mobile unit 40, described herein, that a plurality of wireless mobile units 40 may be provided, each having a unique MIN. In that case, each destination is alerted and the call is terminated to the mobile unit which first answers the call.

FIG. 8 illustrates a message flow similar to that described above in association with FIG. 5, with the modification that the single-number service subscriber is also a call-waiting service subscriber. Call-waiting is a subscriber service well-known in the art. The message flow steps of FIG. 5 which are common for FIG. 8 are similarly numbered. Initially, FIG. 8 shows an active call connection 128 between calling party from telephone 47 to mobile unit 40. A second calling party 48 proceeds to make a call to the single-number service subscriber as outlined in association with FIG. 5, except that instead of MSC 32 paging to alert mobile unit 40, MSC initiates call-waiting alert of mobile unit 40 (shown as 130). The subscriber then answers the call and a second call connection is established with second calling party 48 (shown as 132).

SERVICES SYNCHRONIZATION

Seamless services synchronization requires that service parameter changes made in wireless network 30 must be reflected within wireline network 12, and vice versa. The IS-41 protocol and messages for feature related treatment (FEATREQ) can be used as a basis to implement wireless/wireline service synchronization between the wireless network, (HLR) and the wireline network (WLR).

Figure 6:
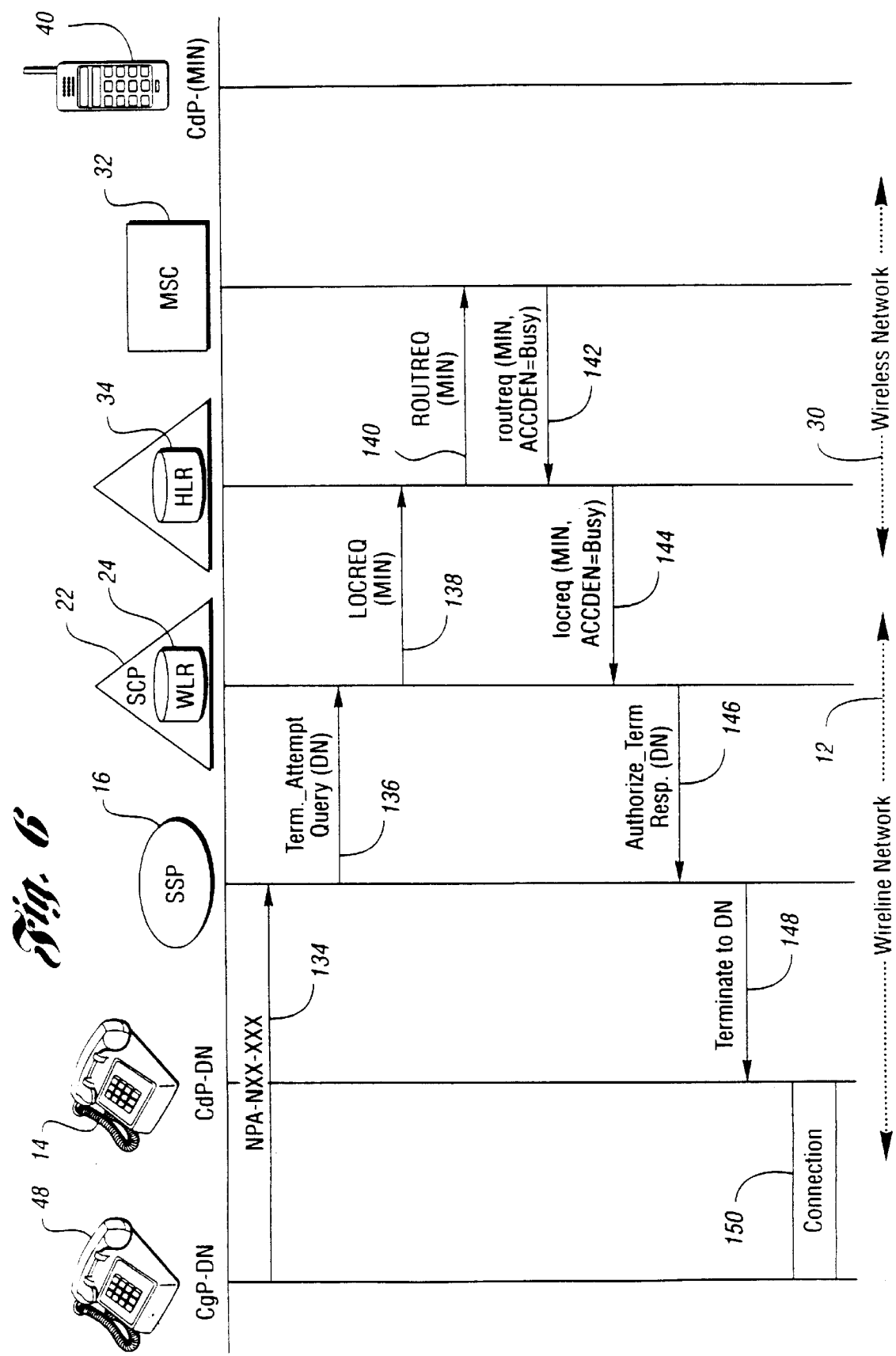
FIG. 6 is a call flow diagram illustrating a call to a busy wireless subscriber in a manner according to the present invention.

Referring now to FIGS. 6 and 7, provided are call flow diagrams for a call complete to a single-number subscriber who is registered in the wireless network (as described in association with FIG. 5), but who is either (1) busy on an active call (FIG. 6); or (2) has inactive call delivery capability (FIG. 7) Similar functions between FIGS. 6 and 7 have like reference numerals.

As shown in FIGS. 6 and 7, calling party 48 dials the 10-digit number (NPA-NXX-XXXX) for the single-number subscriber, which is received by local switch SSP 16 for handling (shown as 134). SSP 16 interrupts the digits which is monitored for the detection of predetermined AIN triggers, like the Termination Attempt Trigger ("TAT"); whereupon SSP 16 issues a Termination Attempt Query to SCP 22, which is in electrical communication with WLR 24 (shown as 136). WLR 24 receives this query, determines that the subscriber is wireless registered (as discussed in association with FIG. 3, above), and issues a Location Request Query ("LOCREQ") to HLR 34 to determine the location (a wireless routing number or address) for the subscriber (shown as 138). Upon receipt of LOCREQ, HLR 34 issues a Routing Request Query ("ROUTREQ") to MSC 32 where the subscriber is registered (shown as 140).

If the single-number subscriber is wireless registered but busy on an active call, the MSC 32 returns to HLR 34 a "routreq response". In FIG. 6, for a mobile unit 40 which is busy on an active call, the "routreq response" contains an access denied indicator (ACCDEN) due to a busy status for the wireless registered subscriber (shown as 142); In FIG. 7, for a mobile unit 40 which has inactive call delivery, the "routreq response" contains an access denied indicator (ACCDEN) due to a call delivery inactive status for the subscriber (shown as 143). HLR 34 will in turn send to WLR 24 a "locreq response" containing the ACCDEN due to either a busy status (FIG. 6) or an inactive status (FIG. 7) (shown as 144 and 145, respectively). SCP 22 returns an AIN Authorize Termination response to SSP 16 containing the DN retrieved from WLR 24 as the terminating number (shown as 146). SSP 16 routes the single-number call to the DN (shown as 148) where wireline DN unit 14 answers the incoming call and call connection is established with the calling party at telephone 48 (shown as 150).

Referring to FIG. 9, call flows are established for a wireless registered single-number subscriber calling his or her own single-number DN. Special AIN/SCP service logic is required to enable a wireless registered single-number subscriber, operating mobile unit 40, to call the corresponding single-number DN in order to prevent the DN call from being re-routed back to the registered mobile unit 40 (MIN). As shown in FIG. 9, mobile unit 40 dials the 10-digit single-number DN (shown as 152). MSC 32 interrupts the dialed digits and routes the call to the serving SSP 16 (shown as 154). SSP 16 interrupts the digits, encounters a TAT and issues a Termination Attempt Query to SCP 22 (shown as 156). WLR 24 receives this query, determines that the subscriber is wireless registered, that the mobile registered subscriber is actually calling his personal single-number DN, and SCP 22 returns and AIN Authorize Termination response to SSP 16 containing the DN as the terminating number (shown as 158). SSP 16 then routes the single-number call to the DN (shown as 160), enabling a connection between the subscriber's mobile unit (MIN) to call his single-number DN (shown as 162).

Lastly, FIG. 10 illustrates a call flow reflecting the pattern of a call unanswered by a registered wireless subscriber with an active mobile unit 40. The beginning of this message flow is similar to that of FIG. 5, and the message flow steps of FIG. 5 which are common for FIG. 10 are similarly numbered. As shown, a calling party 48 proceeds to make a call to the single-number service subscriber as outlined in association with FIG. 5 in steps 108–120. However, upon paging and alerting mobile unit 40 by MSC 32, there is no answer by the subscriber (shown as 164). As a result of there being no answer by the subscriber of mobile unit 40, MSC 32 seeks to redirect the call back to the subscriber's wireline DN 14. MSC 32 issues a redirection request query (REDREQ) to WLR 24 requesting re-routing of the call, the redirection request containing a redirection reason (REDREASON) (as shown in 166).

Because SSP 16 has previously given control of the call to wireless network 30 and has no memory of the call, WLR 24 is unable to retain re-routing information. Thus a redirection request response (redreq response) containing an error message is returned to MSC 32 (as shown in 168). MSC 32 issues to WLR 24 a transfer to number request query (TRANUMREQ) containing a redirection reason (REDREASON) (as shown in 170), since call forwarding has been activated to invoke forwarding of unanswered calls. As previously mentioned, SSP 16 has given control of the call to wireless network 30. In order to maintain the appearance of seamless network integration, call forwarding is used to get the call back to subscriber's wireline DN 14 in wireline network 12. WLR 24 receives the TRANUMREQ and returns a "transfer to number request response" containing the subscriber's wireline DN as the number to which the call is to be re-directed to on the "call forward—do not answer (CFDA)" condition (as shown in 172). MSC 32 receives the "transfer to number request response" (tranumreq response) indicating that the call should be transferred to wireline DN 14 on the CFDA condition. MSC 32 directs SSP 16 to route the call to the subscriber's wireline DN 14 (as shown in 174). Finally, SSP 16 establishes a connection between the calling party 48 and the subscriber's wireline DN 14, since mobile unit 40 did not answer the call initially (as shown in 176).

As those skilled in the art will recognize, the above discussion is one possible solution for when a call delivered to a subscriber's mobile unit 40 goes unanswered, in accordance with the present invention.

While the best mode for carrying out the invention has been described in detail, those familiar with the art to which this invention relates will recognize various alternative designs and embodiments for practicing the invention as defined by the following claims.

What is claimed is:

1. For use in an integrated wireless and wireline communication network an method for providing a single number service to forward a call incoming to a subscriber's designated single telephone number to a routing destination number based on the subscriber's current location, the method comprising:
    storing subscriber mobile registration status data in a wireline location register (WLR) located in the wireline communication network, the WLR in electrical communication with a wireline switch and a Home Location Register (HLR);
    monitoring the wireline switch to detect predetermined AIN triggers;
    generating a query at the wireline switch for receipt by the WLR upon detection of the predetermined AIN triggers, the query requesting subscriber mobile registration status data;
    routing the call from the wireline switch to a wireline destination number stored in the WLR in response to the subscriber mobile registration status data indicating that the subscriber is wireline registered;
    generating a first query at the WLR to the Home Location Register (HLR) of the wireless network in response to the subscriber mobile registration status data indicating that the subscriber is wireless registered, the query requesting a current subscriber mobile location;
    generating a second query at the HLR to a Mobile Switching Center (MSC) where the subscriber is registered, the query requesting a wireless routing destination number;
    communicating a wireless routing destination number from the MSC for delivery to the WLR through the HLR; and
    routing the call from the wireline switch to the MSC to the wireless routing destination number.

2. The method of claim 1, wherein the WLR resides in a Service Control Point (SCP).

3. The method of claim 1 wherein routing the call includes sending the call to a plurality of wireless destinations, each wireless destination having a unique MIN, whereby the call is delivered to the first wireless destination answering the call.

4. The method of claim 1, wherein the wireline switch is an SS7 service switching point (SSP) operable to communicate with the SCP with AIN messages via SS7.

5. The method of claim 1, wherein the wireless routing destination number is a Temporary Local Directory Number (TLDN).

6. A method for providing an interface between wireless and wireline communication networks for exchanging subscriber status information in order to map a call incoming to a subscriber's wireline Directory Number (DN) to a subscriber's wireless mobile location through a Service Switching Point (SSP), the method comprising:
    communicating wireless registration status data from a mobile service controller (MSC) of the wireless communication network to a wireline location register (WRL) located in a Service Control Point (SCP) of the wireline communication network;
    storing the wireline registration status data in the WLR;
    sending a subscriber current location request from the WLR to a Home Location Register (HLR) of the wireless network in response to the wireline registration data indicating that the subscriber is wireless registered;
    sending a query at the HLR to the MSC where the subscriber is located in response to receiving the subscriber current location request, the query requesting a wireless routing destination number;
    communicating a Temporary Location Destination Number (TLDN) from the MSC to the WLR; and
    routing the call from the SSP to the MSC for delivery to the TLDN.

7. The method of claim 6 further comprising sending a registration signal from the subscriber's mobile unit to a Mobile Services Controller (MSC) when the subscriber becomes registered in the wireless communication network.

8. The method of claim 6 wherein routing the call includes sending the call to a plurality of wireless destinations, each wireless destination having a unique MIN, whereby the call is delivered to the first wireless destination answering the call.

9. A method for providing a single-number service adapted for use in wireless and wireline communication networks for exchanging network status information in order to selectively route a call incoming to a subscriber's single telephone number to either a subscriber's wireless or wireline location depending on the wireless registration status of the subscriber, the method comprising:
    communicating wireless registration data from a mobile switching center (MSC) to a Home Location Register (HLR) in the wireless network;
    communicating the wireless registration data from the HLR to a wireline location register (WLR) when the subscriber becomes registered in the wireless network;
    storing the wireless registration data in the WLR;
    communicating a location request query from the WLR to the HLR to determine a location of the subscriber, in response to receiving notification of an incoming call;

generating a routing request query from the HLR to the MSC to determine a routing destination for the subscriber;

responding to the WLR by the MSC the location and the routing destination of the subscriber; and routing the call to a wireless routing destination number (TLDN) in the wireless network corresponding to the location of the subscriber in response to the subscriber being registered in the wireless network.

10. The method of claim 9, further comprising:

if the subscriber is not registered in the wireless network, routing the call to a wireline routing destination number (TLDN) in the wireline network.

11. For use in an integrated wireless/wireline communication network, a system for providing an exchange of network status information in order to route a call incoming to a subscriber's single telephone number to either a subscriber's mobile unit through a Mobile Services Controller (MSC) or to a subscriber's customer premises equipment (CPE) through a Service Switching Point (SSP) depending on the location of the subscriber, the system comprising:

a Wireline Location Register (WLR) located in the wireline communication network and in electrical communication with the SSP for storing subscriber routing information and subscriber registration status data;

a Home Location Register (HLR) located in the wireless communication network and in electrical communication with the WLR and the MSC for storing and communicating to the WLR subscriber routing information and subscriber registration status data; and a service control point (SCP) located in the wireline communication network and provided in electrical communication with the WLR and the SSP, the SCP operable to retrieve the subscriber routing information and provide the subscriber routing information to the SSP.

12. The system of claim 11, further comprising:

a Visitor Location Register (VLR) located in the wireless communication network and provided in electrical communication with the HLR and the MSC, enabling the WLR to issue a query to the HLR requesting a routing destination for subscribers which are wireless registered, thereby allowing the delivery of the call to a one of the subscriber's mobile unit and the subscriber's CPE.

* * * * *

UNITED STATES PATENT AND TRADEMARK OFFICE
CERTIFICATE OF CORRECTION

PATENT NO. : 5,901,359
DATED : May 4, 1999
INVENTOR(S) : Douglas Allen Malmstrom It is certified that error appears in the above-indentified patent and that said Letters Patent is hereby corrected as shown below:

In claim 1, column 14, line 1: after "MSC" insert -- for delivery --

Signed and Sealed this

Twelfth Day of October, 1999

Attest:

Q. TODD DICKINSON

Attesting Officer

Acting Commissioner of Patents and Trademarks